US009286697B2

(12) United States Patent
Igarashi (10) Patent No.: US 9,286,697 B2
(45) Date of Patent: Mar. 15, 2016

(54) RECONFIGURABLE IMAGE PROCESSING APPARATUS WITH VARIABLE COMPRESSION RATE AND RECORDING MEDIUM FOR RECONFIGURABLE IMAGE PROCESSING

(71) Applicant: FUJI XEROX CO., LTD, Minato-ku, Tokyo (JP)

(72) Inventor: Masatomo Igarashi, Kanagawa (JP)

(73) Assignee: FUJI XEROX CO., LTD, Kanagawa (JP)

( * ) Notice: Subject to any disclaimer, the term of this patent is extended or adjusted under 35 U.S.C. 154(b) by 0 days.

(21) Appl. No.: 14/295,957

(22) Filed: Jun. 4, 2014

(65) Prior Publication Data

US 2015/0016734 A1      Jan. 15, 2015

(30) Foreign Application Priority Data

Jul. 9, 2013  (JP) ................................. 2013-143857

(51) Int. Cl.
| G06K 9/36 | (2006.01) |
| G06T 9/00 | (2006.01) |
| H04N 19/46 | (2014.01) |
| H04N 19/593 | (2014.01) |
| H04N 19/42 | (2014.01) |
| H04N 1/64 | (2006.01) |

(52) U.S. Cl.
CPC ........... *G06T 9/00* (2013.01); *H04N 19/42* (2014.11); *H04N 19/46* (2014.11); *H04N 19/593* (2014.11); *H04N 1/64* (2013.01)

(58) Field of Classification Search
None
See application file for complete search history.

(56) References Cited

U.S. PATENT DOCUMENTS

| 5,596,602 A * | 1/1997 | Couwenhoven et al. ...... 375/240 |
| 2002/0101367 A1 * | 8/2002 | Geiger et al. .................... 341/51 |
| 2006/0256466 A1 * | 11/2006 | Katagiri et al. .................. 360/75 |
| 2007/0014353 A1 * | 1/2007 | Yourlo ....................... 375/240.08 |
| 2009/0324110 A1 * | 12/2009 | Fujinuki et al. ................ 382/232 |
| 2011/0179265 A1 * | 7/2011 | Tamatani ....................... 713/100 |
| 2012/0243602 A1 * | 9/2012 | Rajamani et al. .......... 375/240.02 |

FOREIGN PATENT DOCUMENTS

| JP | 2002-344757 A | 11/2002 |
| JP | 2004-242213 A | 8/2004 |
| JP | 2005-278072 A | 10/2005 |
| JP | 2007-081833 A | 3/2007 |
| JP | 2007-150689 A | 6/2007 |
| JP | 2007-281764 A | 10/2007 |
| JP | 2009-003765 A | 1/2009 |

* cited by examiner

*Primary Examiner* — Andrew Moyer
(74) *Attorney, Agent, or Firm* — Sughrue Mion, PLLC

(57) ABSTRACT

An image processing apparatus includes a reconfigurable circuit, a compression unit, an image processing unit, and a controller. The reconfigurable circuit has a reconfigurable circuit configuration. The compression unit is configured as a circuit in the reconfigurable circuit to compress image data. The image processing unit is configured as a circuit in the reconfigurable circuit to perform image processing on the compressed image data. The controller changes the circuit configuration of the reconfigurable circuit so as to vary a compression rate of the compression unit in accordance with a processing capacity of the image processing unit.

13 Claims, 10 Drawing Sheets

RECONFIGURABLE IMAGE PROCESSING APPARATUS WITH VARIABLE COMPRESSION RATE AND RECORDING MEDIUM FOR RECONFIGURABLE IMAGE PROCESSING

CROSS-REFERENCE TO RELATED APPLICATIONS

This application is based on and claims priority under 35 USC 119 from Japanese Patent Application No. 2013-143857 filed Jul. 9, 2013.

BACKGROUND (i) Technical Field

The present invention relates to an image processing apparatus and a recording medium.

(ii) Related Art

The color space of image data is occasionally converted. For example, in the case where image data are to be printed, the image data to be printed are converted into image data represented in an output color space that depends on a printing engine, and the color-converted image data are printed by the printing engine.

SUMMARY

According to an aspect of the present invention, there is provided an image processing apparatus including: a reconfigurable circuit with a reconfigurable circuit configuration; a compression unit configured as a circuit in the reconfigurable circuit to compress image data; an image processing unit configured as a circuit in the reconfigurable circuit to perform image processing on the compressed image data; and a controller that changes the circuit configuration of the reconfigurable circuit so as to vary a compression rate of the compression unit in accordance with a processing capacity of the image processing unit.

BRIEF DESCRIPTION OF THE DRAWINGS

An exemplary embodiment of the present invention will be described in detail based on the following figures, wherein.

DETAILED DESCRIPTION

Figure 1:
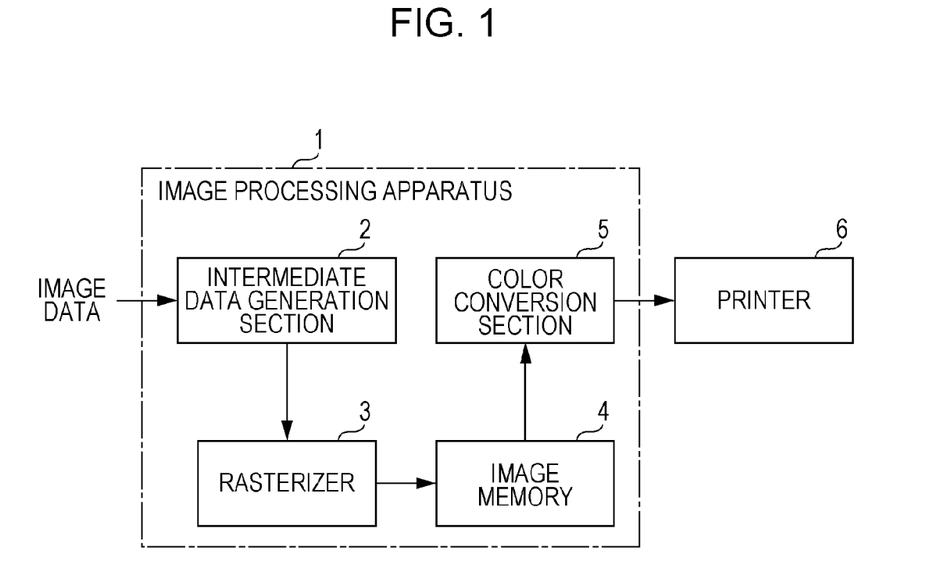
FIG. 1 is a block diagram illustrating an example of a system according to an exemplary embodiment.

FIG. 1 illustrates an example of a system according to an exemplary embodiment of the present invention. The system includes an image processing apparatus 1 and a printer 6. The image processing apparatus 1 includes an intermediate data generation section 2, a rasterizer 3, an image memory 4, and a color conversion section 5.

For example, image data described in a page description language (PDL) are provided from a device such as a computer to the image processing apparatus 1. The page description language is a computer programming language for an information processing device to execute a printing process, a displaying process, and so forth. The image data described in the page description language include positional information, format information, color information, and so forth of objects such as characters and graphics that constitute an image to be printed.

For example, image data represented by a combination of cyan, magenta, yellow, and black (CMYK) (image data represented in a CMYK color space) or image data represented by a combination of red, green, and blue (RGB) (image data represented in an RGB color space) are provided to the image processing apparatus 1. The color spaces described above are exemplary, and the present invention is not limited thereto. The image data may be represented in a color space other than the color spaces described above.

The intermediate data generation section 2 interprets the image data to generate and output intermediate data in which the image to be printed is described in an intermediate language. The intermediate data are data before being converted into drawn image data that are finally output to the printer 6, and include a command representing a procedure for generation of the drawn image data. Specific examples of the intermediate data include a display list (DL). However, the present invention is not limited thereto.

The rasterizer 3 is a raster image processor, for example. The rasterizer 3 acquires the intermediate data from the intermediate data generation section 2, and generates drawn image data that adapt the printer 6 to be handled by the printer 6 in accordance with the intermediate data. The drawn image data are raster data including information (pixel value) on each pixel constituting a printed image, for example. By way of example, the drawn image data may be bit-map data. The rasterizer 3 accesses an image memory 4 (frame memory) and writes the drawn image data into the image memory 4 to cause the image memory 4 to store the drawn image data.

The color conversion section 5 functions as a color management system (CMS), and converts the drawn image data into data in a device color space, which is a color space that depends on the printer 6. By way of example, in the case where the device color space of the printer 6 is the CYMK color space, the color conversion section 5 converts the drawn image data into data in the CMYK color space (CMYK color signals). For example, in the case where the drawn image data are data represented in the CMYK color space (CMYK color signals), the color conversion section 5 applies a look-up table (LUT) to the CMYK color signals, for example, to convert the drawn image data into CMYK color signals, which are data in the device color space. In the case where the drawn image data are data represented in the RGB color space (RGB color signals), the color conversion section 5 converts the drawn image data (RGB color signals) into CMYK color signals, which are data in the device color space.

The printer 6 uses color materials (recording materials) such as toners or inks to print an image matching the drawn image data on a recording medium such as paper. The printer 6 uses toners in various colors such as cyan (C), magenta (M), yellow (Y), and black (K), for example, to form an image on a recording medium by an electrophotographic process. It should be noted, however, that the present invention is not limited thereto, and color materials in other colors may also be used, and color materials in five or more colors may also be used.

In the image processing apparatus 1 discussed above, a dynamic reconfigurable processor (DRP), for example, is used to execute a process.

Figure 2:
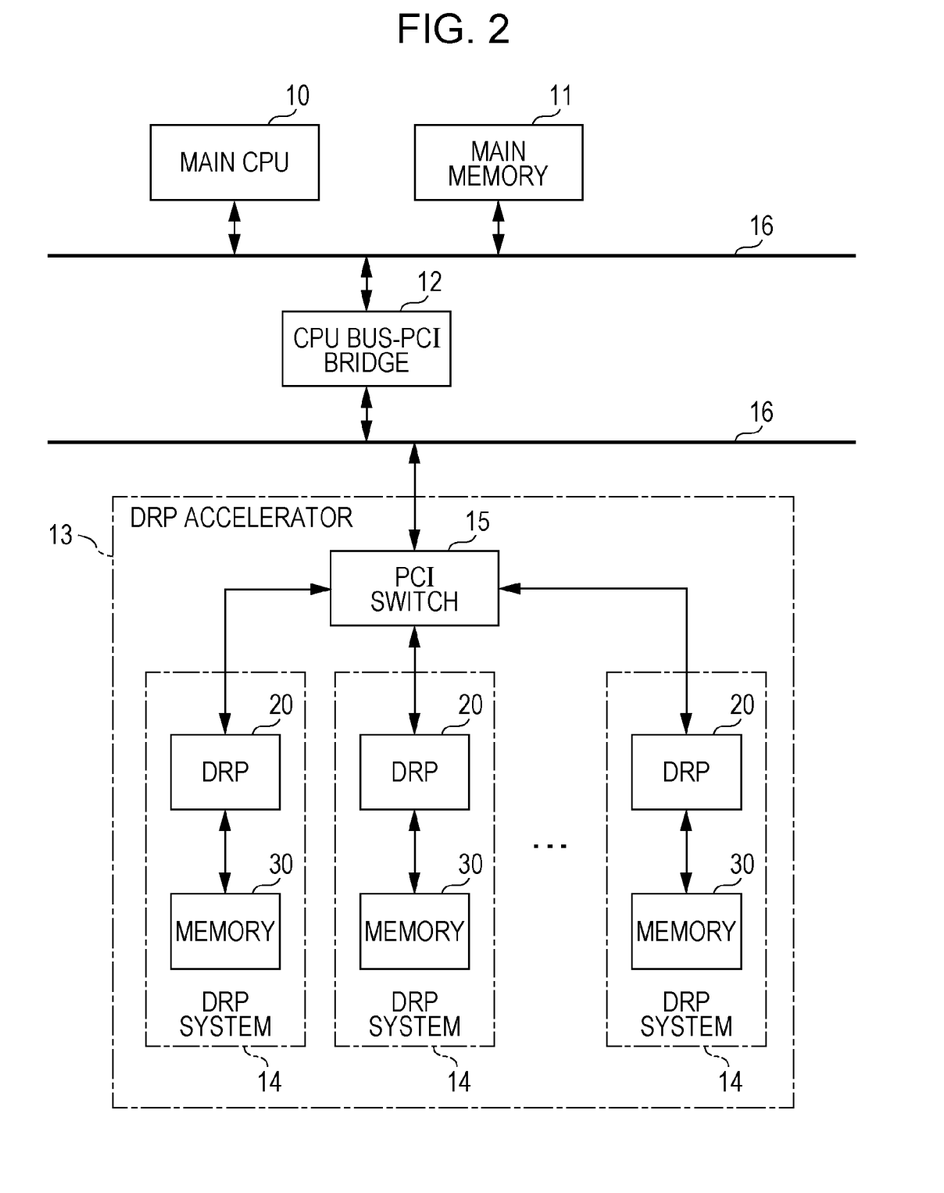
FIG. 2 is a block diagram illustrating an example of a system that performs a process using a reconfigurable circuit.

FIG. 2 illustrates an example of a system that performs a process using the DRP. By way of example, the system includes a main central processing unit (CPU) 10, a main memory 11, a CPU bus-PCI bridge 12, a DRP accelerator 13, and an internal bus 16 that connects between such components. The DRP accelerator 13 includes plural DRP systems 14 and a PCI switch 15, for example. The plural DRP systems 14 are connected to the PCI switch 15. The DRP systems 14 each include a DRP 20 and a memory 30. The memory 30 stores data, a program, and so forth for controlling the DRP 10.

Figure 3:
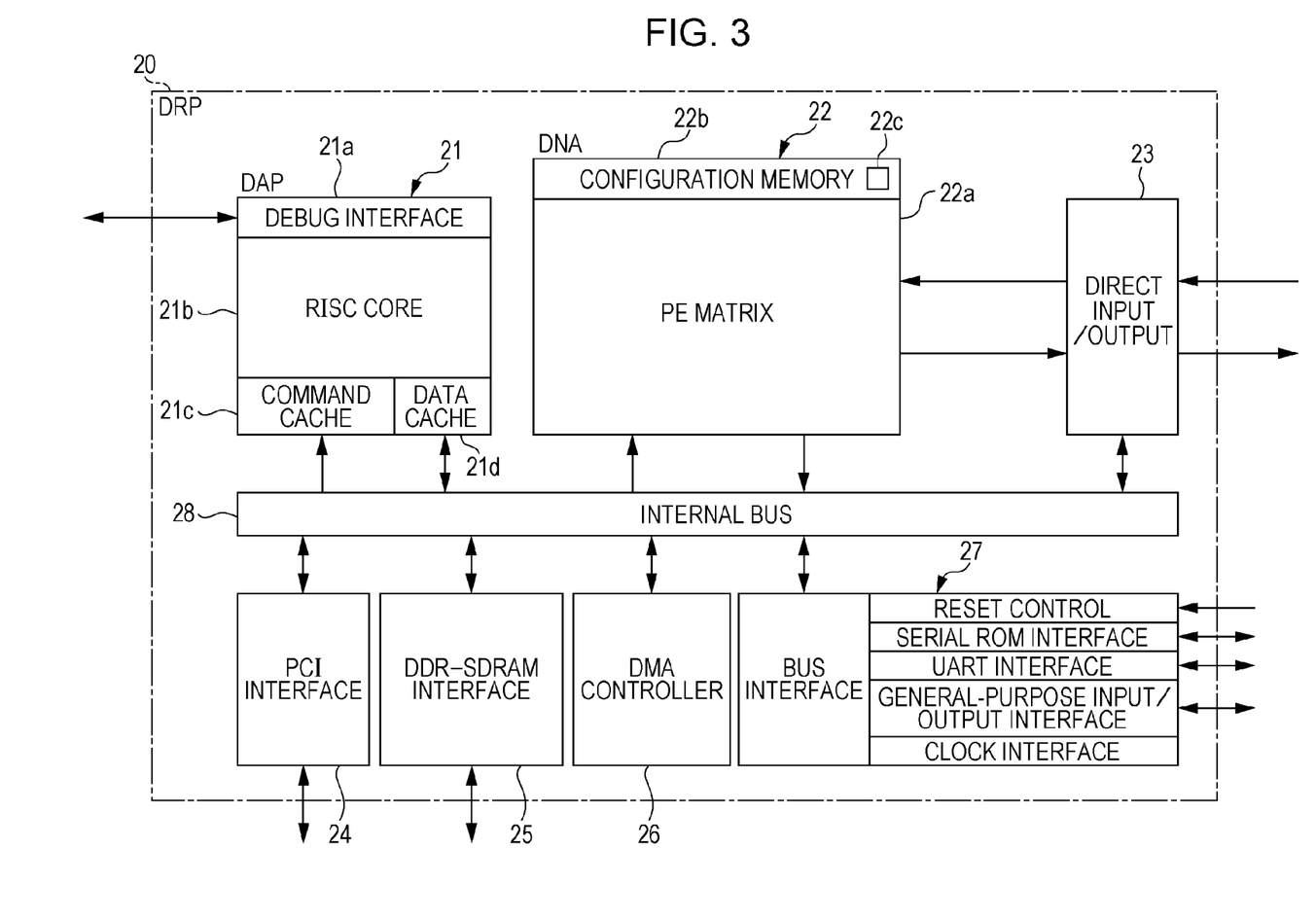
FIG. 3 is a block diagram illustrating an example of the hardware configuration of an image processing apparatus according to the exemplary embodiment.

FIG. 3 illustrates an example of the hardware configuration of the image processing apparatus 1. In the example illustrated in FIG. 3, the image processing apparatus 1 is constituted by the DRP 20.

The DRP 20 is a processor capable of dynamically changing (reconfiguring) the configuration of an internal logic circuit. By way of example, the DRP 20 is a processor with a DAP/DNA architecture in the related art. However, the present invention is not limited thereto, and the DRP 20 may be configured by a different circuit. An example of the DRP 20 will be described below with reference to FIG. 3.

The DRP 20 includes a reconfiguration controller 21 (RISC core module) referred to as a "digital application processor (DAP)", and a reconfigurable circuit section 22 (dynamic configurable data flow accelerator) referred to as a "distributed network architecture (DNA)". In addition to the reconfiguration controller 21 and the reconfigurable circuit section 22, the DRP 20 also includes an interface 23 for direct input and output to and from the reconfigurable circuit section 22, a PCI interface 24, an SDRAM interface 25, a DMA controller 26, other peripheral devices 27, and an internal bus (high-speed switching bus) 28 that connects between such components. The reconfiguration controller 21 includes a debug interface 21a, a RISC core 21b, a command cache 21c, and a data cache 21d. The reconfigurable circuit section 22 includes a PE matrix 22a and a configuration memory 22b. In the PE matrix 22a, plural process elements PE (logic circuit elements) are disposed two-dimensionally. By way of example, 376 process elements PE are disposed in the PE matrix 22a. The configuration memory 22b stores configuration data 22c. The configuration data 22c are data for reconfiguring the PE matrix 22a by changing the function of and/or the connection between the process elements PE included in the PE matrix 22a.

The reconfiguration controller 21 is a module that controls operation of the entire DRP 20 including the reconfigurable circuit section 22, and is implemented by executing a program for control, for example. The reconfiguration controller 21 controls the connection between the process elements PE in the PE matrix 22a to configure a circuit for data processing in the PE matrix 22a. In addition, the reconfiguration controller 21 supplies data to the circuit configured in the PE matrix 22a, and outputs data from the circuit to another system.

The configuration data 22c are data for prescribing the circuit configuration of the PE matrix 22a. The circuit in the PE matrix 22a is reconfigured in accordance with the configuration data 22c. The configuration memory 22b stores plural pieces of the configuration data 22c. When one of the plural pieces of the configuration data 22c in the configuration memory 22b is selected to be active, a circuit configuration prescribed by the selected piece of the configuration data 22c is configured in the PE matrix 22a. By way of example, the configuration memory 22b stores three pieces of the configuration data 22c. It should be noted, however, that the present invention is not limited thereto, and the number of pieces of the configuration data 22c stored in the configuration memory 22b may be other than three.

The configuration memory 22b is described in detail. The configuration memory 22b has plural banks. A first function of the PE matrix 22a is implemented by the configuration data 22c stored in a foreground bank. In addition, a second function or a third function of the PE matrix 22a is implemented by pieces of the configuration data 22c stored in different background banks, respectively. The second function or the third function, rather than the first function, is reconfigured in the PE matrix 22a by switching the banks of the configuration memory 22b. The PE matrix 22a is reconfigured dynamically in one cycle (clock cycle), for example. The PE matrix 22a is a reconfiguration unit including the plural process elements PE for configuring a circuit and internal wiring that connects between the process elements PE. The connection between the process elements PE is changed by the internal wiring to reconfigure the circuit included in the PE matrix 22a.

In addition, the DRP 20 has functions of adding a new piece of the configuration data 22c to the configuration memory 22b, replacing a piece of the configuration data 22c in the configuration memory 22b with another piece of the configuration data 22c, and deleting a piece of the configuration data 22c from the configuration memory 22b.

Next, the color conversion section 5 is described with reference to FIG. 4. The color conversion section 5 is constituted by the DRP 20. The color conversion section 5 includes a DDR memory 50, a DDR controller 51, memories 52 to 55 that function as input buffers, a compressor 56, a FIFO 57, a processing circuit 58, a delay circuit 59 which is a D flip-flop (D-FF) circuit, for example, an expander 60, and memories 61 to 64 that function as output buffers.

The DDR memory 50 stores the drawn image data generated by the rasterizer 3. The DDR controller 51 reads the drawn image data from the DDR memory 50, and outputs the drawn image data to the memories 52 to 55 serving as the input buffers. By way of example, in the case where the drawn image data are data represented in the CMYK color space (CMYK color signals), the DDR controller 51 outputs a C signal to the memory 52 for the C signal, outputs an M signal to the memory 53 for the M signal, outputs a Y signal to the memory 54 for the Y signal, and outputs a K signal to the memory 55 for the K signal. The memories 52 to 55 store the respective signals. The compressor 56 reads the C signal from the memory 52 to perform a compression process, reads the M signal from the memory 53 to perform a compression process, reads the Y signal from the memory 54 to perform a compression process, reads the K signal from the memory 55 to perform a compression process, and outputs the compressed CMYK color signals and a compression flag to the FIFO 57. The compressed CMYK color signals are output from the FIFO 57 to the processing circuit 58. The compression flag is output from the FIFO 57 to the delay circuit 59.

The processing circuit 58 converts the compressed CMYK color signals into CMYK color signals, which are data in the device color space, and outputs the CMYK color signals in the device color space to the expander 60. For example, the processing circuit 58 generates a cyan (C) signal using a LUT for the C signal that converts the CMYK color signals into a C signal in the device color space, generates a magenta (M) signal using a LUT for the M signal that converts the CMYK color signals into an M signal in the device color space, generates a yellow (Y) signal using a LUT for the Y signal that converts the CMYK color signals into a Y signal in the device color space, and generates a black (K) signal using a LUT for the K signal that converts the CMYK color signals into a K signal in the device color space.

The expander 60 expands the CMYK color signals, which are data in the device color space, on the basis of the compression flag, and outputs the expanded CMYK color signals to the memories 61 to 64 serving as the output buffers. For example, the expander 60 outputs a C signal to the memory 61 for the C signal, outputs an M signal to the memory 62 for the M signal, outputs a Y signal to the memory 63 for the Y signal, and outputs a K signal to the memory 64 for the K signal. The memories 61 to 64 store the respective signals. Then, the DDR controller 51 reads the expanded C signal from the memory 61 to output the read signal to the DDR memory 50, reads the expanded M signal from the memory 62 to output the read signal to the DDR memory 50, reads the expanded Y signal from the memory 63 to output the read signal to the DDR memory 50, and reads the expanded K signal from the memory 64 to output the read signal to the DDR memory 50.

The drawn image data are converted into data represented in the device color space in the manner described above.

In another example, in the case where the drawn image data are data represented in the RGB color space (RGB color signals), the DDR controller 51 outputs an R signal to the memory 52 for the R signal, outputs a G signal to the memory 53 for the G signal, and outputs a B signal to the memory 54 for the B signal. The compressor 56 compresses the RGB color signals, and outputs the compressed signals to the FIFO 57. The processing circuit 58 converts the compressed RGB color signals into CMYK color signals, which are data in the device color space, and outputs the CMYK color signals to the expander 60. For example, the processing circuit 58 generates a C signal using a LUT for the C signal that converts the RGB color signals into a C signal in the device color space, generates an M signal using a LUT for the M signal that converts the RGB color signals into an M signal in the device color space, generates a Y signal using a LUT for the Y signal that converts the RGB color signals into a Y signal in the device color space, and generates a K signal using a LUT for the K signal that converts the RGB color signals into a K signal in the device color space. Then, the expander 60 performs an expansion process. The expanded CMYK color signals are stored in the memories 61 to 64. The DDR controller 51 reads the expanded CMYK color signals from the memories 61 to 64, and outputs the read signals to the DDR memory 50.

The reconfiguration controller 21 of the DRP 20 changes the circuit configuration of the reconfigurable circuit section 22 (PE matrix 22a) so as to vary the compression rate of the compressor 56 in accordance with the processing capacity of the processing circuit 58. For example, the reconfiguration controller 21 sets the maximum compression rate of the compressor 56 such that the volume of the compressed data output from the compressor 56 per unit time and the processing speed of the processing circuit 58 (volume of data processed per unit time) match each other.

For example, the reconfiguration controller 21 changes the circuit configuration of the reconfigurable circuit section 22 so as to vary the compression rate of the compressor 56 in accordance with the band (input/output band) between the DDR memory 50 and the DDR controller 51 and the processing capacity of the processing circuit 58. Specifically, the reconfiguration controller 21 sets the compression rate of the compressor 56 such that the total of the volume (input band) of data output from the DDR controller 51 to the memories 52 to 55 per unit time and the volume (output band) of data output from the memories 61 to 64 to the DDR controller 51 per unit time is equal to or less than the input/output band, and such that the volume of the compressed data output from the compressor 56 per unit time and the processing speed of the processing circuit 58 (volume of data processed per unit time) match each other. The volume of the expanded data output from the expander 60 per unit time corresponds to the volume of data output from the memories 61 to 64 to the DDR controller 51 per unit time.

Alternatively, the reconfiguration controller 21 may set the compression rate of the compressor 56 such that the total of the input band and the output band is equal to the input/output band, and such that the volume of the compressed data output from the compressor 56 per unit time and the processing speed of the processing circuit 58 match each other.

For example, plural pieces of the configuration data 22c for configuring the compressor 56 with different compression rates are stored in the configuration memory 22b. The reconfiguration controller 21 selects a piece of the configuration data 22c in accordance with the input/output band and the processing capacity of the processing circuit 58, and controls the connection between the process elements PE in the PE matrix 22a in accordance with the selected piece of the configuration data 22c to configure a compression circuit matching the input/output band and the processing capacity of the processing circuit 58.

Figure 4:
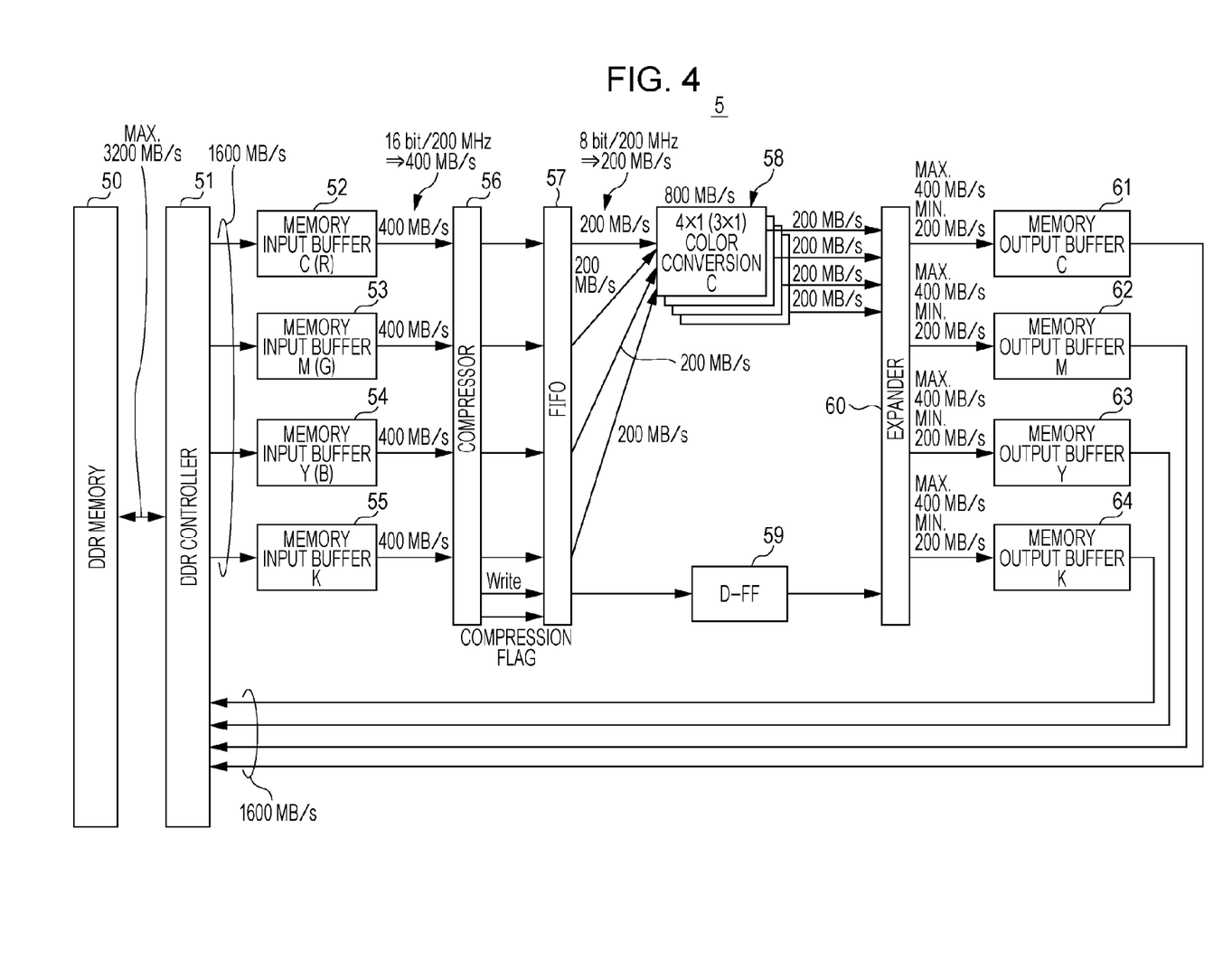
FIG. 4 is a block diagram illustrating an example of the configuration of a color conversion section according to the exemplary embodiment.

In the example illustrated in FIG. 4, the effective value of the band (input/output band) between the DDR memory 50 and the DDR controller 51 is 3200 MB/s at the maximum, for example. In addition, the processing capacity of the processing circuit 58 is 8 bits/200 MHz, for example, and the processing circuit 58 performs a color conversion at a processing speed of 200 MB/s per color signal. Thus, the processing circuit 58 generates CMYK color signals in the device color space at a processing speed of 800 MB/s. Specifically, the processing circuit 58 generates a C signal, an M signal, a Y signal, and a K signal at a processing speed of 200 MB/s, and outputs the generated signals to the expander 60.

In the case where the processing capacity (processing speed) of the processing circuit 58 is 800 MB/s and the maximum value of the input/output band is 3200 MB/s as described above, the input band and the output band may be set to 1600 MB/s, and the compression rate of the compressor 56 may be set to two to make the volume of the drawn image data half. A detailed description will be made below.

In the case where the effective value of the input band is 1600 MB/s, the C signal, the M signal, the Y signal, and the K signal in an amount of 400 MB per unit time are output from the corresponding memories 52 to 55 to the compressor 56. Then, in the case where the compression rate of the compressor 56 is two, the volume of the data compressed by the compressor 56 is half the volume of the uncompressed data. Since data in an amount of 1600 MB per unit time are input to the compressor 56, compressed data in an amount of 800 MB per unit time are output from the compressor 56 to the FIFO 57. Specifically, the C signal, the M signal, the Y signal, and the K signal in an amount of 400 MB per unit time are output from the corresponding memories 52 to 55 to the compressor 56, and the C signal, the M signal, the Y signal, and the K signal in an amount of 200 MB per unit time are output from the compressor 56 to the FIFO 57.

Then, the C signal, the M signal, the Y signal, and the K signal in an amount of 200 MB per unit time are output from the FIFO 57 to the processing circuit 58. That is, the CMYK color signals in an amount of 800 MB per unit time are output from the FIFO 57 to the processing circuit 58. Since the processing capacity (processing speed) of the processing circuit 58 is 800 MB/s, the volume of data input to the processing circuit 58 (volume of data input per unit time) and the processing speed of the processing circuit 58 match each other. Then, the processing circuit 58 outputs the color-converted CMYK color signals to the expander 60. Consequently, the C signal, the M signal, the Y signal, and the K signal in an amount of 200 MB per unit time are output from the processing circuit 58 to the expander 60.

The expander 60 expands the compressed CMYK color signals on the basis of the compression flag, and outputs the expanded CMYK color signals to the memories 61 to 64. In the case where the compression rate is two, the volume of the data expanded by the expander 60 is twice the volume of the unexpanded data. Since data in an amount of 800 MB per unit time are input to the expander 60, expanded data in an amount of 1600 MB per unit time are output from the expander 60 to the memories 61 to 64. Specifically, the C signal, the M signal, the Y signal, and the K signal in an amount of 400 MB per unit time are output from the expander 60 to the corresponding memories 61 to 64.

Then, the C signal, the M signal, the Y signal, and the K signal in an amount of 400 MB per unit time are output from the memories 61 to 64 to the DDR controller 51. That is, the effective value of the output band is 1600 MB/s.

In the case where the compression rate is set to one and the drawn image data are not compressed, the input band is restricted to 800 MB/s since the processing speed of the processing circuit 58 is 800 MB/s, and the output band is 800 MB/s. A comparison is made between a case where the compression rate is two and a case where the compression rate is one. In the case where the compression rate is two, the input band is 1600 MB/s, and the C signal, the M signal, the Y signal, and the K signal in an amount of 400 MB per unit time are output from the expander 60 (400 MB/s at the maximum). In the case where the compression rate is one, meanwhile, the input band is 800 MB/s, and the C signal, the M signal, the Y signal, and the K signal in an amount of 200 MB per unit time are output from the expander 60 (200 MB/s at the minimum).

Figure 5:
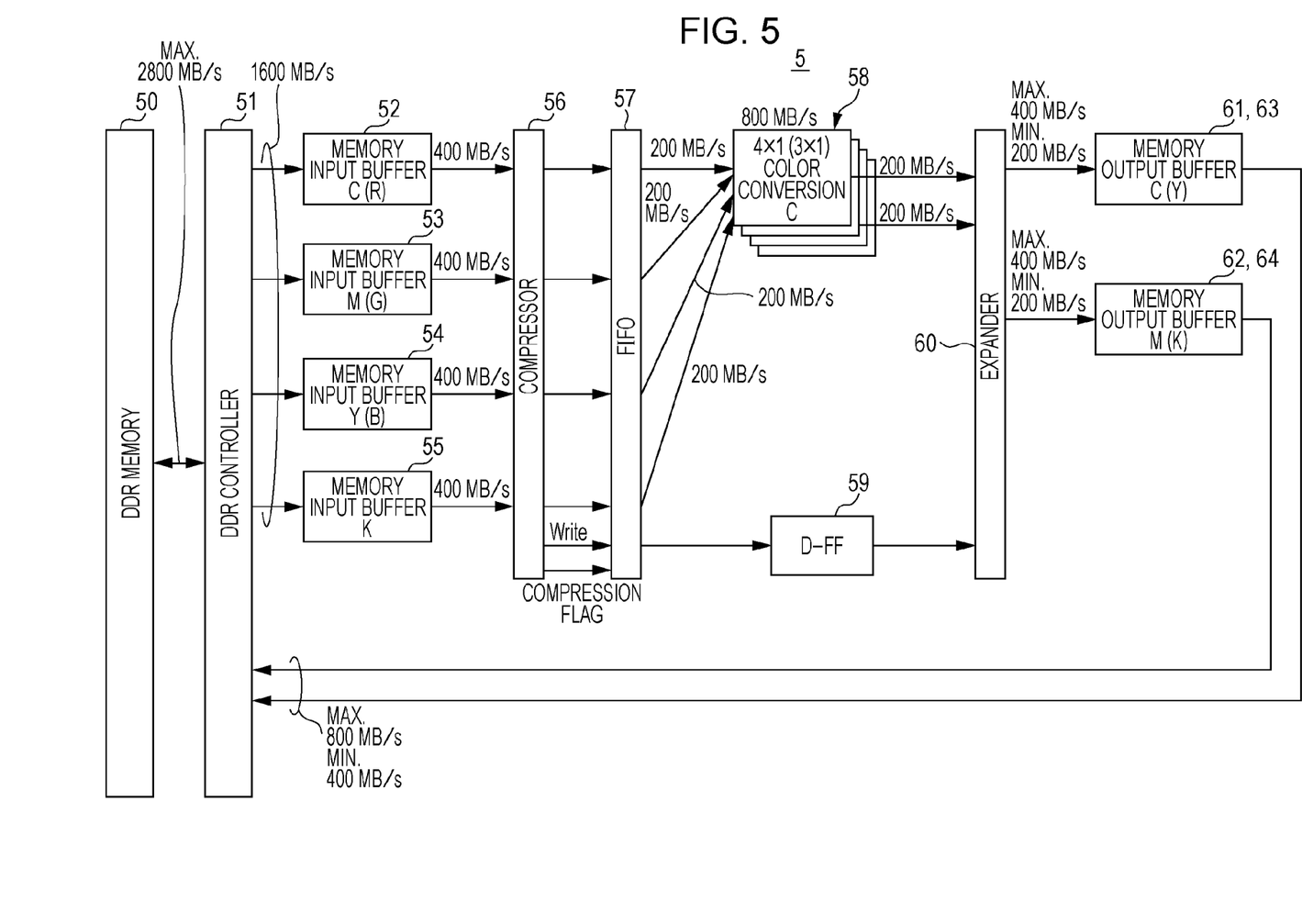
FIG. 5 is a block diagram illustrating an example of the configuration of the color conversion section according to the exemplary embodiment.

Next, another example of the color conversion section 5 is described with reference to FIG. 5. In the example illustrated in FIG. 5, the effective value of the input/output band is 2800 MB/s at the maximum, for example. In this case, unlike the example illustrated in FIG. 4, the total of the input band and the output band exceeds the input/output band if both the input band and the output band are set to 1600 MB/s. Also in this case, the reconfiguration controller 21 sets the compression rate of the compressor 56 such that the total of the input band and the output band is equal to or less than the input/output band, and such that the volume of the compressed data output from the compressor 56 per unit time and the processing speed of the processing circuit 58 match each other. By way of example, in the case where the input band is 1600 MB/s and the output band 800 MB/s, the compression rate of the compressor 56 may be set to two. A detailed description will be made below.

In the case where the effective value of the input band is 1600 MB/s and the compression rate of the compressor 56 is twice, the CMYK color signals in an amount of 800 MB per unit time are output from the FIFO 57 to the processing circuit 58 as in the example illustrated in FIG. 4. In the example illustrated in FIG. 5, the input/output band is 2800 MB/s, the input band is 1600 MB/s, and thus there remains a band of 800 MB/s for the output band. Thus, the processing circuit 58 performs a color conversion such that the volume of data output from the expander 60 per unit time is equal to or less than 800 MB/s. For example, the processing circuit 58 does not generate all the CMYK color signals in the device color space at a time, but generates the CMYK color signals separately in plural times. First, the processing circuit 58 generates a C signal using the LUT for the C signal, and generates an M signal using the LUT for the M signal. Consequently, the C signal and the M signal in an amount of 200 MB per unit time are output from the processing circuit 58 to the expander 60. The expander 60 expands the compressed C signal and M signal on the basis of the compression flag, and outputs the expanded C signal and M signal to the memories 61 and 62. Since the C signal and the M signal in an amount of 200 MB per unit time are input to the expander 60, expanded C signal and M signal in an amount of 400 MB per unit time are output from the expander 60 to the corresponding memories 61 and 62. Then, the C signal and the M signal in an amount of 400 MB per unit time are output from the corresponding memories 61 and 62 to the DDR controller 51. That is, the effective value of the output band is 800 MB/s.

The Y signal and the K signal in the device color space are also generated in the same manner. In this case, the processing circuit 58 generates a Y signal using the LUT for the Y signal, and generates a K signal using the LUT for the K signal. Then, the expander 60 expands the compressed Y signal and K signal on the basis of the compression flag, and outputs the expanded Y signal and K signal to the memories 63 and 64. Then, the Y signal and the K signal in an amount of 400 MB per unit time are output from the corresponding memories 63 and 64 to the DDR controller 51.

In the case where the compression rate is set to one and the drawn image data are not compressed, the input band is restricted to 800 MB/s since the processing speed of the processing circuit 58 is 800 MB/s, and the output band is 400 MB/s. In the example illustrated in FIG. 5, in the case where the compression rate is two, the C signal and the M signal (or the Y signal and the K signal) in an amount of 400 MB per unit time are output from the expander 60 (400 MB/s at the maximum). In the case where the compression rate is one, meanwhile, the C signal and the M signal (or the Y signal and the K signal) in an amount of 200 MB per unit time are output from the expander 60 (200 MB/s at the minimum).

Next, an example of the compression process performed by the compressor 56 is described. The compressor 56 performs run-length compression, for example. By way of example, the compressor 56 performs a compression process in the case where the values of adjacent pixels, among pixels constituting the drawn image data, are the same as each other. It should be noted, however, that the compression scheme used in the present invention is not limited to the run-length compression, and other compression schemes may also be used.

Figure 6:
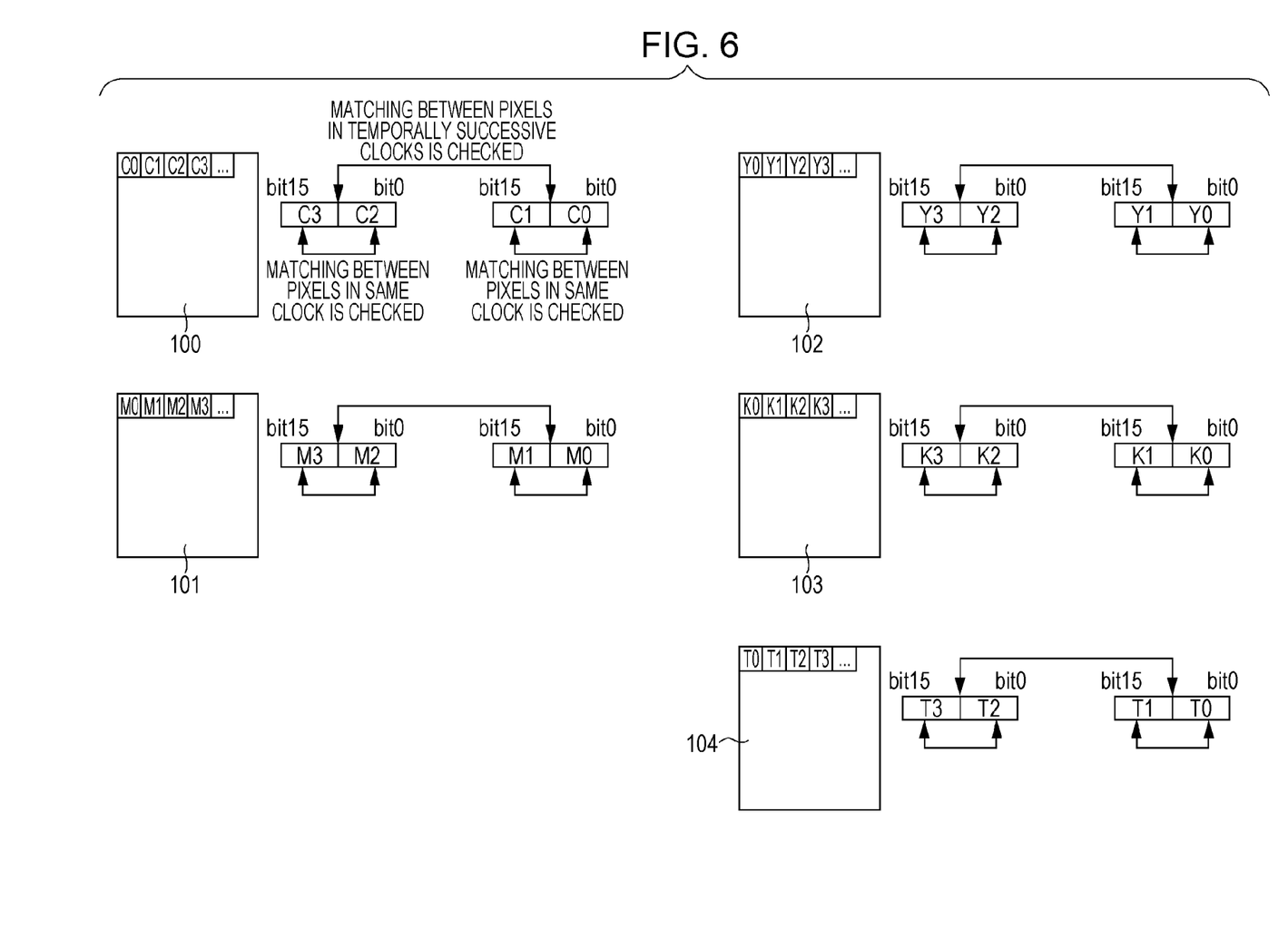
FIG. 6 illustrates an example of a compression process.

FIG. 6 illustrates an example of the compression process. In FIG. 6, a C signal 100, an M signal 101, a Y signal 102, a K signal 103, and Tag data 104 before a color conversion are illustrated. The C signal 100 includes the values of plural pixels such as pixels C0, C1, C2, . . . . As with the C signal 100, the M signal 101, the Y signal 102, the K signal 103, and the Tag data 104 also include the values of plural pixels. The Tag data 104 are data that prescribe color information (such as a color space, for example) on the drawn image data.

The compressor 56 performs a compression process in the case where the values of adjacent pixels are the same as each other. For example, the compressor 56 compares the values of plural pixels included in the same clock (or, in the same period), and further compares the values of plural pixels included in each of temporally successive clocks. Then, in the case where the values of the plural pixels included in the same clock are the same as each other and the values of the plural pixels included in each of the temporally successive clocks are the same as each other, the compressor 56 performs a compression process on the pixels included in one of the clocks. A description is made using the C signal 100 as an example. The compressor 56 compares the values of the pixels C0 and C1 included in the same clock, and compares the values of the pixels of the pixels C2 and C3 included in the same clock. Further, the compressor 56 determines the pixels C0 and C1 and the pixels C2 and C3 included in the temporally successive clocks as subjects to be compared, and compares the values of the pixels C0 and C1 and the values of the pixels C2 and C3. Then, in the case where the values of the pixels C0 and C1 included in the same clock are the same as each other, the values of the pixels C2 and C3 are the same as each other, and further, the values of the pixels C0 and C1 and the values of the pixels C2 and C3 included in the temporally successive clocks are the same as each other, the compressor 56 performs a compression process on either the pixels C0 and C1 or the pixels C2 and C3. For example, the compressor 56 does not output the values of the pixels C2 and C3 but outputs the values of the pixels C0 and C1, and outputs a compression flag indicating that the values of the pixels C2 and C3 are the same as the values of the pixels C0 and C1. As with the C signal 100, the M signal 101, the Y signal 102, the K signal 103, and the Tag data 104 are also subjected to a compression process.

Next, the process performed by the compressor 56 is described in detail with reference to FIG. 7. First, when drawn image data (a C signal, an M signal, a Y signal, a K signal, and Tag data) are input to the compressor 56, an XOR circuit 56a compares the values of plural pixels included in the same clock, and outputs the comparison results. A signal (A) illustrated in FIG. 7 indicates the results of the comparison between the plural pixels included in the same clock. For example, the XOR circuit 56a outputs "1" as the value of the signal (A) in the case where the values of the plural pixels included in the same clock are the same as each other, and outputs "0" as the value of the signal (A) in the case where the values of the plural pixels are not the same as each other. The signal (A) is input to an AND circuit 56e and a delay circuit (1 delay) 56c. The signal (A) is subjected to a delay process for one clock performed by the delay circuit 56c, and a delayed signal (B) is input to the AND circuit 56e. Meanwhile, the drawn image data are subjected to a delay process for one clock performed by a delay circuit (1 delay) 56b. Then, the delayed signal is input to an XOR circuit 56d. The XOR circuit 56d compares the values of plural pixels included in each of temporally successive clocks, and outputs the comparison results. A signal (C) illustrated in FIG. 7 indicates the results of the comparison between the plural pixels included in each of the temporally successive clocks. For example, the XOR circuit 56d outputs "1" as the value of the signal (C) in the case where the values of the plural pixels included in each of the temporally successive clocks are the same as each other, and outputs "0" as the value of the signal (C) in the case where the values of the plural pixels are not the same as each other. The signal (C) is input to the AND circuit 56e. Then, the AND circuit 56e generates a signal (D) indicating that the values of the plural pixels included in the same clock and the temporally successive clocks are the same as or not the same as each other. For example, the AND circuit 56e outputs "1" as the value of the signal (D) in the case where the values of the plural pixels included in the same clock and the temporally successive clocks are the same as each other, and outputs "0" as the value of the signal (D) in the case where the values of the plural pixels are not the same as each other. The signal (D) is input to a write pulse generator (FIFO write generator) 56f.

The write pulse generator 56f generates a write pulse (E) for writing the drawn image data into the FIFO 57 on the basis of the signal (D). Of the values of the write pulse (E), "1" indicates that the drawn image data are written, and "0" indicates that the drawn image data are not written. For example, the write pulse generator 56f inevitably writes the first data included in the drawn image data into the FIFO 57. Thus, the initial value of the write pulse (E) is "1". Then, the write pulse generator 56f outputs "1" as the value of the write pulse (E) if the value of the input signal (D) is "0", and outputs a value determined by a toggle operation as the value of the write pulse (E) if the value of the input signal (D) is "1". In the toggle operation, the write pulse generator 56f outputs "0" as the value of the write pulse (E) in the case where the values of the plural pixels included in the same clock and the temporally successive clocks are the same as each other and the value of the preceding write pulse (E) is "1" (in the case where the drawn image data are written into the FIFO 57), and outputs "1" as the value of the write pulse (E) in the case where the values of the plural pixels included in the same clock and the temporally successive clocks are the same as each other and the value of the preceding write pulse (E) is "0" (in the case where the drawn image data are not written into the FIFO 57). Then, the write pulse (E) output from the write pulse generator 56f is subjected to a delay process for two clocks performed by a delay circuit 56h (2 delay), and input to the FIFO 57.

For example, the value of the write pulse (E) corresponding to each of the timings (1) to (5) of the signal (D) is as follows:
(1) The initial output value of the pulse (E) is "1".
(2) Since the value of the signal (D) is "1", the value of the pulse (E) is turned into "0" by toggle operation.
(3) Since the value of the signal (D) is "0", the value of the pulse (E) is "1".
(4) Since the value of the signal (D) is "0", the value of the pulse (E) is "1".
(5) Since the value of the signal (D) is "1", the value of the pulse (E) is turned into "0" by toggle operation.

In addition, the write pulse generator 56f generates a compression flag (G), and outputs the generated flag to the FIFO 57. The compression flag (G) is information indicating whether or not there are any pixels, the values of which in the same clock and temporally successive clocks are the same as each other and the values of which are not written into the FIFO 57. Of the values of the compression flag (G), "1" indicates that there are any pixels, the values of which in the same clock and temporally successive clocks are the same as each other and the values of which are not written into the FIFO 57, and "0" indicates that there are no such pixels. That is, in the case where the value of the compression flag is "1", the drawn image data have been compressed. In the example illustrated in FIG. 7, the value of the write pulse (E) at the timings (2) and (5) is "0". If a signal (F) obtained by delaying the signal (D) by two clocks is referenced, the values of the plural pixels included in the same clock and temporally successive clocks are the same as each other at the timings (2) and (5). Thus, the write pulse generator 56f outputs "1" as the value of the compression flag (G) at the timings (2) and (5). In addition, the drawn image data are subjected to a delay process performed by a delay circuit (N delay) 56g.

As described above, the write pulse (E), the compression flag (G), and the drawn image data are input to the FIFO 57, and the drawn image data are written into the FIFO 57 in accordance with the write pulse (E). For example, since the value of the write pulse (E) at the timings (1), (3), and (4) is "1", the values of the pixels corresponding to the timings (1), (3), and (4) of the write pulse (E) are written into the FIFO 57. On the other hand, since the value of the write pulse (E) at the timings (2) and (5) is "0", the values of the pixel corresponding to the timings (2) and (5) of the write pulse (E) are not written into the FIFO 57. In addition, the compression flag (G) is written into the FIFO 57.

A description is made using the signal (C) as an example. For example, in the case where the values of the pixels C0 and C1 included in the same clock are the same as each other, the values of the pixels C2 and C3 included in the same clock are the same as each other, and the values of the pixels C0 and C1 and the values of the pixels C2 and C3 included in temporally successive clocks are the same as each other, the values of the pixels C0 and C1 are written into the FIFO 57, and the values of the pixels C2 and C3 are not written into the FIFO 57. In this case, "0001" is written into the FIFO 57 as the value of the compression flag (G) indicating that the values of the pixels C2 and C3 are not written into the FIFO 57. In the case where there are not any such pixels, the values of which in the same clock and temporally successive clocks are the same as each other and the values of which are not written into the FIFO 57, on the other hand, "0000" is written into the FIFO 57 as the value of the compression flag (G). For example, the values of the pixels (C0, C1), the pixels (C4, C5), and the pixels (C6, C7) are written into the FIFO 57, and the values of the pixels (C2, C3) and the pixels (C8, C9) are not written into the FIFO 57. Then, "0001" is written into the FIFO 57 as the value of the compression flag (G) indicating that the values of the pixels (C2, C3) and the pixels (C8, C9) are not written into the FIFO 57. Also for the M signal, the Y signal, and the K signal, as for the C signal, the drawn image data are written into the FIFO 57 in accordance with the write pulse (E), and the compression flag (G) for each of the M signal, the Y signal, and the K signal is written into the FIFO 57.

In the process described above, in the case where the values of plural pixels included in the same clock and temporally successive clocks are the same as each other, the values of pixels included in one of the clocks are not written into the FIFO 57, and thus the drawn image data are compressed.

Next, the process for expansion is described in detail with reference to FIG. 8. First, a read pulse generator 57a generates a read pulse for reading one piece of data for every two clocks, and outputs the generated pulse to the FIFO 57. Consequently, data 110 are output from the FIFO 57 to a parallel/serial converter 58a, and subjected to a parallel/serial conversion performed by the parallel/serial converter 58a. The parallel/serial-converted data 120 are subjected to a color conversion performed by the processing circuit 58. The color-converted data 130 are subjected to a serial/parallel conversion performed by a serial/parallel converter 58b. A calibration for the color conversion may be performed by the processing circuit 58. In addition, the compression flag is subjected to a delay process performed by the delay circuit (N delay) 59, and output to the expander 60. The expander 60 expands the serial/parallel-converted data 140 in accordance with the compression flag, and outputs the expanded data 150 to the memory 61 (62 to 64). At this time, in the case where the value of the compression flag in a certain clock is "0001", the expander 60 uses data in the certain clock to generate data in the clock next to the certain clock. In the case where the value of the compression flag in a certain clock is "0000", on the other hand, the expander 60 uses data in the clock next to the certain clock as the data in the next clock. A description is made using the C signal as an example. Since the values of the pixels C2 and C3 are the same as the values of the pixels C0 and C1, the values of the pixels C0 and C1 are used as the values of the pixels C2 and C3. In addition, since the values of the pixels C8 and C9 are the same as the values of the pixels C6 and C7, the values of the pixels C6 and C7 are used as the values of the pixels C8 and C9. The expansion process is performed in this manner. Also for the M signal, the Y signal, and the K signal, as for the C signal, the expansion process is performed in accordance with the compression flag. Although the read pulse generator 57a, the parallel/serial converter 58a, and the serial/parallel converter 58b are not illustrated in FIGS. 4 and 5, such components are also included in the color conversion section 5.

Figure 7:
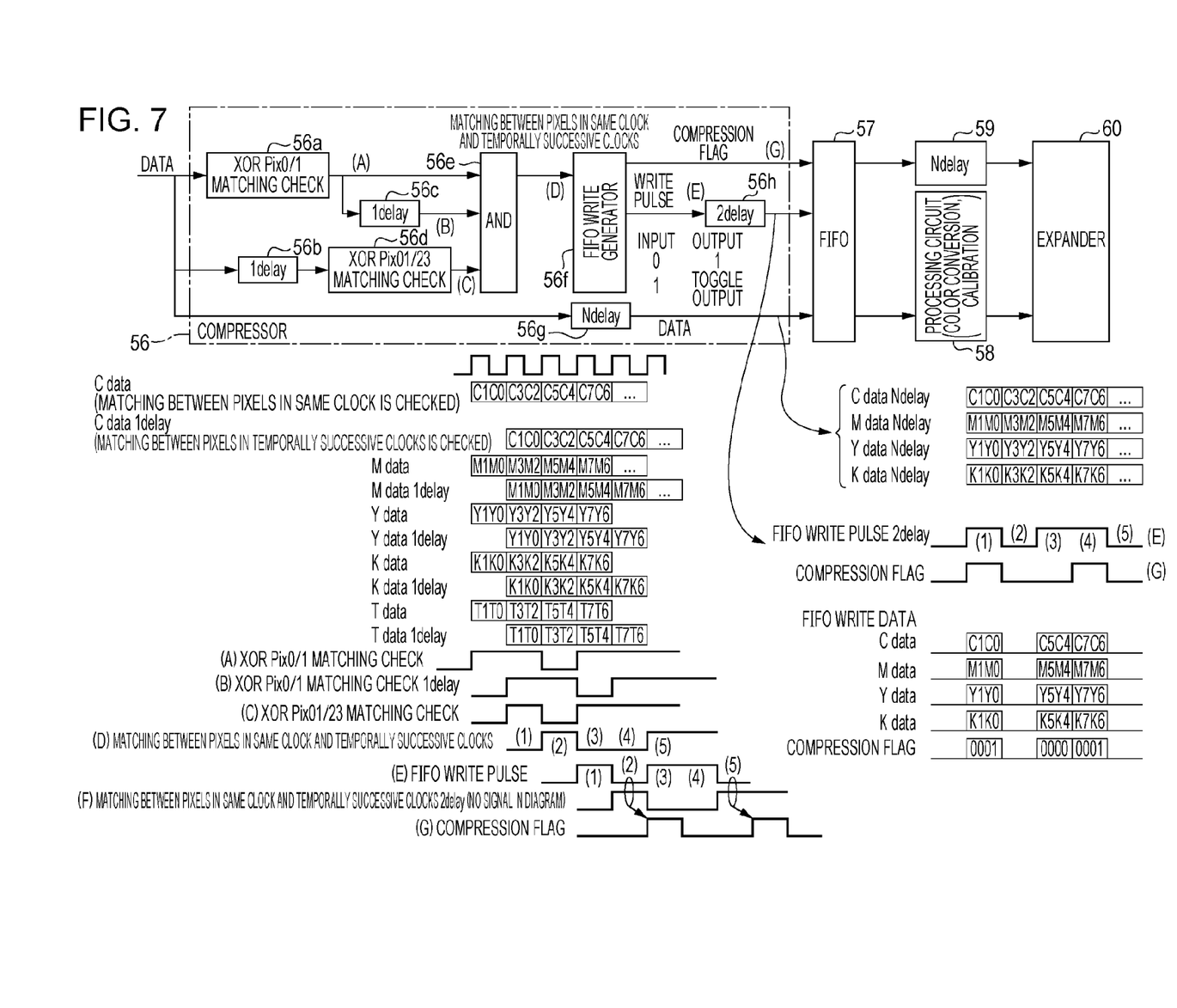
FIG. 7 illustrates an example of the compression process.
Figure 8:
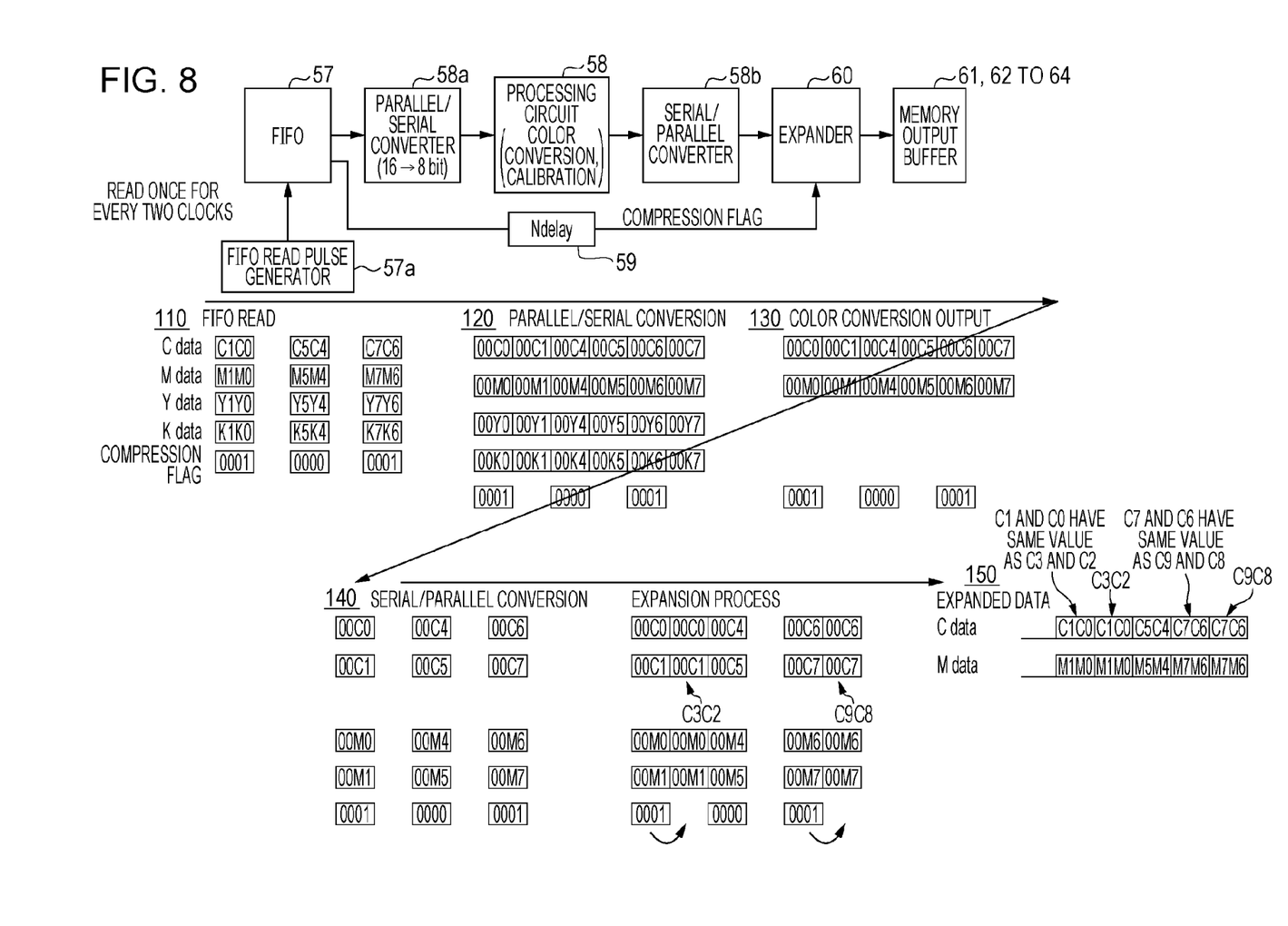
FIG. 8 illustrates an example of an expansion process.

The circuits used for the compression process and the expansion process are not limited to the circuits illustrated in FIGS. 7 and 8, and other circuits may also be used.

Figure 9:
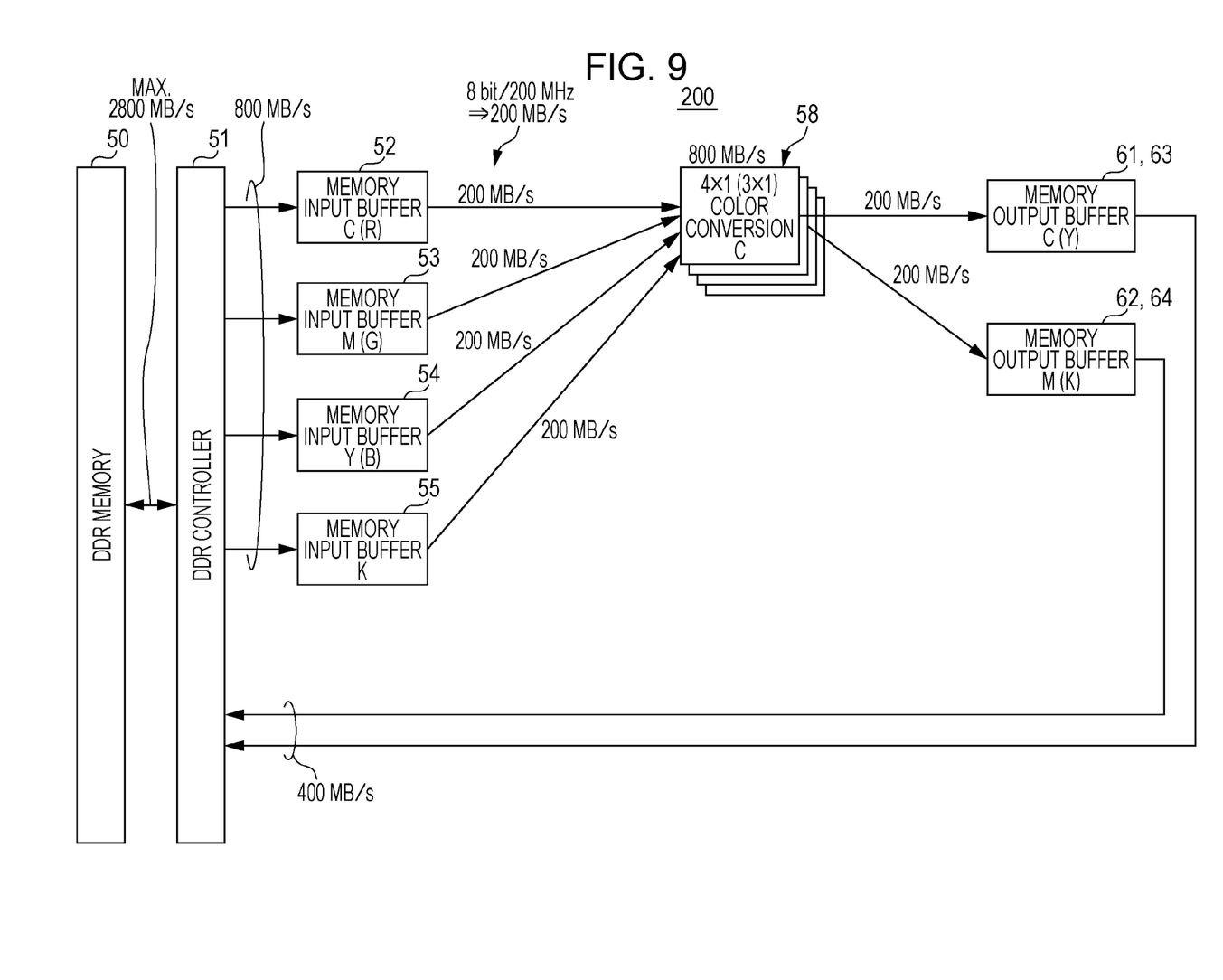
FIG. 9 is a block diagram illustrating an example of the configuration of a color conversion section according to a comparative example.

Next, a color conversion section 200 according to a reference example will be described with reference to FIG. 9. The color conversion section 200 according to the reference example does not include a compressor or an expander, and does not perform a compression process on drawn image data. It is assumed, as illustrated in FIG. 9, for example, that the effective value of the input/output band is 2800 MB/s at the maximum. In order to suppress occurrence of a waiting time for data input to the processing circuit 58, the input band is set to 800 MB/s since the processing speed of the processing circuit 58 is 800 MB/s. The C signal and the M signal in an amount of 200 MB per unit time are generated by the processing circuit 58, and are stored in the corresponding memories 61 and 62. Then, the C signal and the M signal in an amount of 200 MB per unit time are output from the corresponding memories 61 and 62 to the DDR controller 51. That is, the effective value of the output band is 400 MB/s. The Y signal and the K signal in the device color space are also generated in the same manner, and output to the DDR controller 51.

In the case where drawn image data are not compressed, as described above, the input band is restricted, which reduces the processing efficiency of the color conversion section 200. With the color conversion section 5 according to the exemplary embodiment, in contrast, the input band is not restricted as opposed to the reference example, which improves the processing efficiency compared to the reference example. For example, while the color conversion section 200 according to the reference example has a restricted input band of 800 MB/s, the color conversion section 5 according to the exemplary embodiment illustrated in FIGS. 4 and 5 has an input band of 1600 MB/s. Therefore, the color conversion section 5 according to the exemplary embodiment may achieve a processing capacity that is twice that of the reference example. In the reference example, in addition, the total of the input band (800 MB/s) and the output band (400 MB/s) is 1200 MB/s, and only less than half of the input/output band (2800 MB/s) is used. On the other hand, the input/output band is maximally utilized in the exemplary embodiment illustrated in FIG. 4, and about 80% of the input/output band is utilized in the exemplary embodiment illustrated in FIG. 5. Thus, according to the exemplary embodiment, the input/output band is effectively utilized compared to the reference example.

Figure 10:
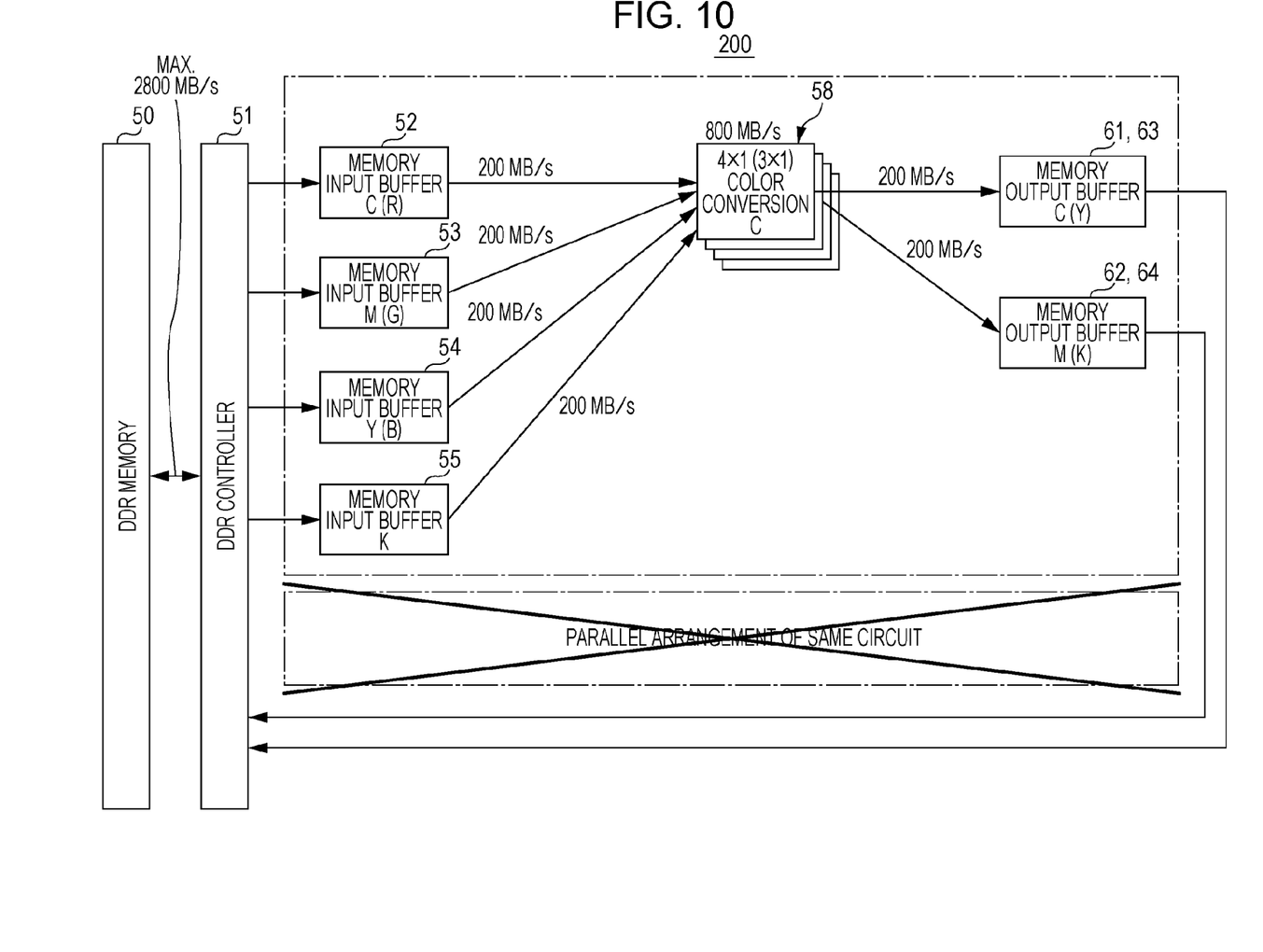
FIG. 10 is a block diagram illustrating an example of the configuration of the color conversion section according to the comparative example.

It is also conceivable to provide circuits each including the memories 52 to 55, the processing circuit 58, and the memories 61 and 62, which are included in the color conversion section 200 according to the reference example, in parallel as illustrated in FIG. 10. Because the circuits are so large in scale that it is difficult to implement the circuits in the DRP, however, it is difficult to achieve such a parallel arrangement. With the exemplary embodiment, in contrast, occurrence of a waiting time for data input to the processing circuit 58 and occurrence of a waiting time at the processing circuit 58 is suppressed, which improves the processing efficiency. That is, according to the exemplary embodiment, the processing efficiency is improved with less hardware resources compared to a case where the circuits are arranged in parallel.

In another example, the reconfiguration controller 21 may vary the compression rate of the compressor 56 in accordance with the type of an object represented in the drawn image data. For example, the reconfiguration controller 21 may set the compression rate to a relatively low value in the case where the object represented in the drawn image data is a text with characters, and may set the compression rate to a relatively high value in the case where the object represented in the drawn image data is a graphic. In still another example, the reconfiguration controller 21 may vary the compression rate of the compressor 56 for each page of the drawn image data. For example, in the case where the volume of data is different for each page, the reconfiguration controller 21 may set the compression rate for each page in accordance with the volume of the data. In this case, the reconfiguration controller 21 changes the circuit configuration of the reconfigurable circuit section 22 for each page.

In the exemplary embodiment described above, a color conversion is performed as an example of the image processing. However, the image processing performed by the processing circuit 58 is not limited to the color conversion, and other image processing may also be performed. That is, the present invention may be applied not only to a color conversion process, but also to a variety of other image processing.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a reconfigurable circuit with a reconfigurable circuit configuration;
a compression unit configured as a circuit in the reconfigurable circuit to compress image data;
an image processing unit configured as a circuit in the reconfigurable circuit to perform image processing on the compressed image data by the compression unit, the compression unit being configured simultaneously with the image processing unit; and
a controller that changes the circuit configuration of the reconfigurable circuit so as to vary a compression rate of the compression unit in accordance with a processing capacity of the image processing unit,
wherein the image processing unit performs image processing while at the same time the compression unit is compressing image data.

2. The image processing apparatus according to claim 1, further comprising:
a memory configured as a circuit in the reconfigurable circuit to store the image data;
an expansion unit configured as a circuit in the reconfigurable circuit to expand the compressed image data which have been subjected to the image processing; and
a memory controller configured as a circuit in the reconfigurable circuit to acquire the image data from the memory and output the acquired image data to the compression unit, and to acquire the expanded image data from the expansion unit and output the acquired expansion image data to the memory,
wherein the controller changes the circuit configuration of the reconfigurable circuit so as to vary the compression rate of the compression unit in accordance with a speed of transfer of the image data between the memory controller and the memory and the processing capacity of the image processing unit.

3. The image processing apparatus according to claim 1,
wherein the controller determines the compression rate of the compression unit such that a volume of the compressed image data output from the compression unit per unit time and a volume of the image data processed by the image processing unit per unit time are the same as each other.

4. The image processing apparatus according to claim 1,
wherein the compression unit performs a compression process in the case where values of adjacent pixels, among pixels constituting the image data, are the same as each other.

5. The image processing apparatus according to claim 1,
wherein the image processing unit is a color conversion unit that performs a color conversion on the compressed image data to generate output image data represented in an output color space.

6. The image processing apparatus according to claim 1, wherein the image processing includes color image processing of the image data.

7. The image processing apparatus according to claim 6, wherein the color image processing of the image data includes color conversion.

8. The image processing apparatus according to claim 1, wherein the controller changes the circuit configuration of the reconfigurable circuit so as to vary the compression rate of the compression unit so that a volume of image data being output from the compression unit matches a volume of image data being processed by the image processing unit.

9. A non-transitory computer readable medium storing a program causing a computer to execute a process comprising:
providing a reconfigurable circuit with a reconfigurable circuit configuration;
compressing image data through a compression unit configured in the reconfigurable circuit;
performing image processing on the compressed image data through an image processing unit configured in the reconfigurable circuit; and
simultaneously changing the circuit configuration of the compression unit and the image processing unit in the reconfigurable circuit so as to vary a compression rate of the compression unit in accordance with a processing capacity of the image processing unit,
wherein the image processing is performed while at the same time the image data is being compressed.

10. The non-transitory computer readable medium according to claim 9, wherein the image processing includes color image processing of the image data.

11. The non-transitory computer readable medium according to claim 10, wherein the color image processing of the image data includes color conversion.

12. The non-transitory computer readable medium according to claim 9, wherein the circuit configuration of the reconfigurable circuit is changed so as to vary the compression rate of the compression unit so that a volume of image data being output from the compression unit matches a volume of image data being processed by the image processing unit.

13. The non-transitory computer readable medium according to claim 9, wherein the image data compression and the image processing on the compressed image data are performed in parallel.

* * * * *